Aug. 16, 1938.   D. G. GRISWOLD   2,126,991
FLOW CONTROL FAUCET FOR BEER OR THE LIKE
Filed June 27, 1936   2 Sheets-Sheet 2
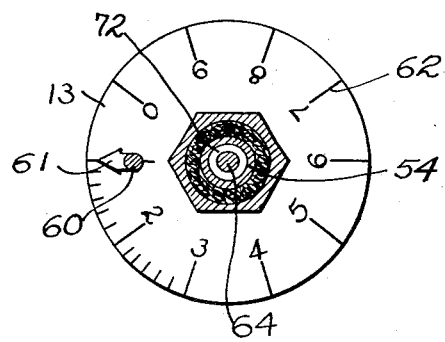
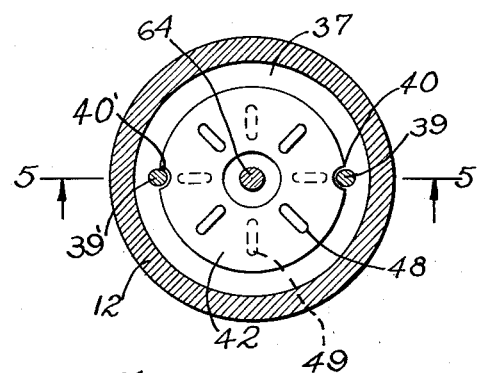
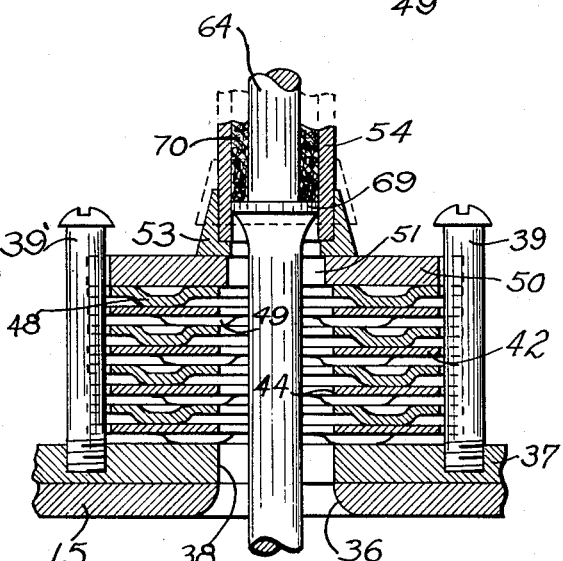
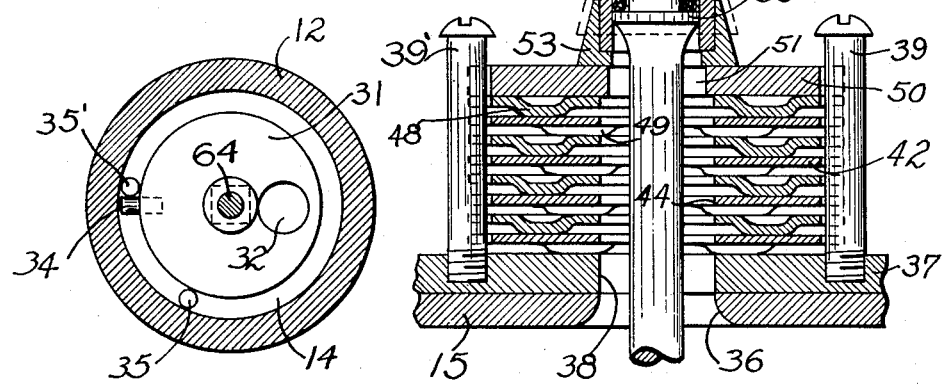
*INVENTOR.*
DONALD G. GRISWOLD
BY
*ATTORNEY.*

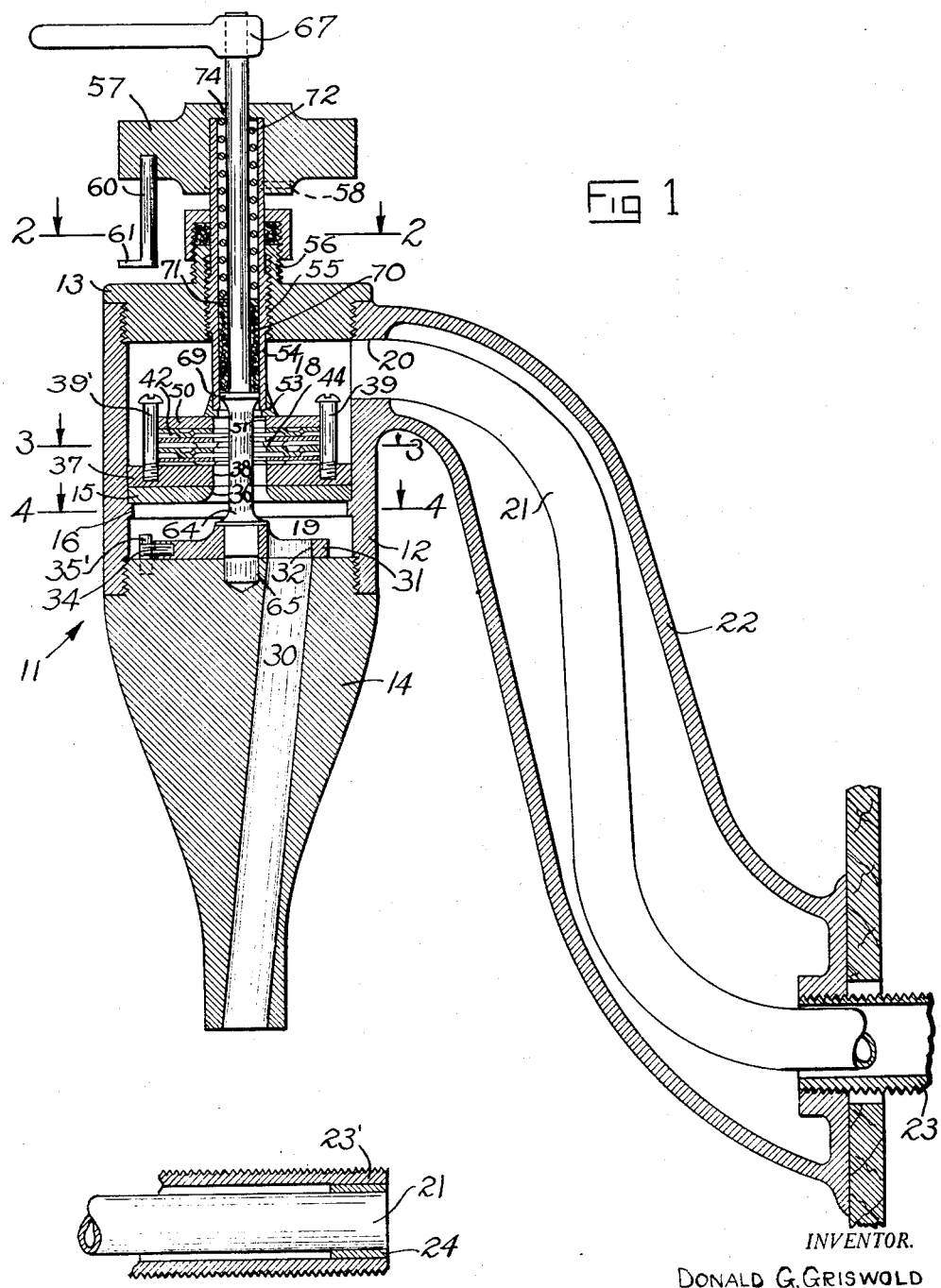

Patented Aug. 16, 1938

2,126,991

UNITED STATES PATENT OFFICE 2,126,991

FLOW CONTROL FAUCET FOR BEER OR THE LIKE

Donald G. Griswold, Alhambra, Calif., assignor to Clayton Manufacturing Company, a corporation of California Application June 27, 1936, Serial No. 87,739

8 Claims. (Cl. 225—6)

This invention has to do in a general way with dispensing systems for carbonated beverages and the like and is more particularly related to flow control means which have been especially designed for use in the dispensing of draught beer.

It is well known that beer contains large quantities of carbon dioxide gas in solution which, if released by an elevated temperature or by a premature drop in pressure, causes undue foaming of the beer which is highly undesirable both to the customer and the retailer.

It has been discovered that if means are provided in a beer dispensing system for offering a substantial resistance to the flow of beer therethrough that the excessive foaming of the beer can be eliminated. This is probably due to the fact that the turbulence in the beer is governed by the velocity of flow and by reducing the velocity of flow this turbulence is decreased. Also the resistance to flow tends to maintain the keg or barrel pressure on the beer over a longer period of time, the maintenance of such pressure holding the gas in solution. Based upon this discovery attempts have been heretofore made to offer resistance to the flow of the beer by providing long lengths of coils through which the beer must flow in reaching the faucet. This provision has met with a certain amount of success, but it has one serious disadvantage in that there is no way of regulating or adjusting the resistance offered by the coils to obtain any desired flow condition, to suit the other conditions of the system which may vary from time to time.

It therefore becomes a primary object of this invention to provide a device which is of extremely compact construction and may be positioned in the draught arm just adjacent the point at which the beer is released to the atmosphere, which will offer sufficient resistance to the flow of the beer so that the foaming thereof can be accurately controlled within any desired limits. I have discovered that through the use of my device it is not necessary to employ coils of any nature and where the beer barrel itself is properly refrigerated the space occupied by the beer dispensing system incorporating my system may be materially reduced.

My invention contemplates a device which may be easily inspected and cleaned and it is a further important feature of the invention that it may be adjusted by the operator so as to give the proper flow under predetermined pressure and temperature conditions with the draught valve or faucet wide open, thereby eliminating the usual unsatisfactory attempts to regulate the flow by the faucet. In this connection my invention contemplates the use of an indicator in conjunction with the adjustment means whereby the device may be dismantled and cleaned if necessary and reassembled and adjusted to the point which has been previously ascertained as giving the proper flow conditions.

It is a further object of this invention to provide a device of the class described which incorporates as an element thereof flow resisting means to serve the additional function of filtering the beer so as to remove any sediment which may have been carried into the draught arm from the keg.

In its broader aspect, my invention contemplates a method for controlling the flow of beer, such method incorporating the step of causing the beer stream to flow through a plurality of fine sheets or films thereby giving a large area through which the beer may flow and at the same time offering a great frictional resistance to flow due to the cohesive action between these thin sheets or films of beer and their confining surfaces.

The details in the method and apparatus contemplated by this invention, together with further objects attending its production will be best understood from the following description of the accompanying drawings which are chosen for illustrative purposes only, and in which Fig. 1 is a sectional elevation showing an exemplary form of my invention contained within the faucet on the draught arm of a beer dispensing system;

Fig. 1a is a fragmentary sectional elevation illustrating a conventional connection between the beer delivery conduit and its enclosing pipe;

Fig. 2 is a plan section taken in a plane represented by the line 2—2 of Fig. 1;

Fig. 3 is a plan section taken in a plane represented by the line 3—3 of Fig. 1;

Fig. 4 is a plan section taken in a plane represented by the line 4—4 of Fig. 1; and Fig. 5 is an enlarged and exaggerated fragmentary sectional elevation taken along the line 5—5 of Fig. 1 and illustrating details in the construction of one form of flow resisting unit contemplated by this invention.

More particularly describing the invention as herein illustrated, reference numeral 11 indicates what I have termed a housing which is comprised of a cylindrical section 12 having a cover plate 13 threaded into its top and a nozzle fitting 14 threaded into its lower end.

Near the bottom of the shell 12 I provide what may be termed a partition member 15 shown as being supported on an inwardly extending rib 16 and sealed in any suitable manner within the housing so as to divide it into what I have termed an inlet chamber 18 and an outlet chamber 19. The inlet chamber 18 is provided with an inlet opening 20 within which an inlet conduit 21 is sealed in any suitable manner, such inlet conduit being contained within a hollow supporting arm 22 and extending outwardly from such an arm into an enclosing pipe of conventional construction indicated at 23.

In order to protect the beer in the draught system against heating, for the reasons pointed out above, the supporting arm is shown as being of sufficient cross sectional area to leave a substantial space around the tubing section 21 enclosed therein. This space may be a dead air space, it may be evacuated, or it may be filled with suitable insulating material to protect the beer in such conduit against the absorption of heat.

As illustrated in Fig. 1a, the end of the conduit 21 is sealed by means of a packing sleeve 24 within the end of the enclosing pipe 23, the end 23' of such pipe being adapted for connection through the medium of a suitable union (not shown) to the coil or pipe which in turn leads to the source of beer.

The outlet chamber 19 has a discharge passage 30 which is shown as extending downwardly through the nozzle member 14 and is adapted to be opened and closed through the medium of a valve member 31. This valve member 31 may be of any conventional construction but is shown as comprising a disc valve plate having an opening 32 therein adapted to be rotated into and out of registration with the passage 30 and as is best illustrated in Fig. 4, the valve disc 31 is provided with a radially extending pin 34 adapted to engage stop pins 35 and 35' mounted on the upper face of the fitting 14 as the valve is moved to and from its open and closed positions.

The partition plate 15 is shown as having a central opening 36 and a filter or resistance unit supporting plate 37 is shown as being mounted on top of this partition member, the supporting plate 37 also has a central opening 38 therethrough.

Mounted on the supporting plate 37 and held against rotation with respect thereto in any suitable manner such as by means of screws or pins 39 and 39' extending through suitably positioned peripheral notches 40 and 40', is a stack of thin metal plates generally indicated by reference numeral 42. These plates which in this form of my invention are in the nature of discs have aligned central passages therethrough indicated generally by reference numeral 44, such openings being positioned in coaxial relation with the apertures 36 and 38 in the plates 15 and 37 respectively.

It is through the medium of these discs or plates that I cause the beer to flow in the thin sheets or films mentioned above, and in order to accomplish this, it is necessary that each of the individual discs be associated with means for holding them in spaced relation with each other. Furthermore, in order that the spacing between the discs or plates can be adjusted by the application of pressure to the stack, it is important that the spacing means be of a yieldable nature. In this particular form of my invention I accomplish the spacing of the discs by forming angularly spaced bosses or buttons on the discs, the bosses on the successive discs being positioned in staggered relation as indicated by the full line 48 and the dotted line 49 in Fig. 3.

It should be pointed out that the discs or plates illustrated in the drawings are greatly exaggerated in thickness as are the spaces therebetween. In actual practice, I have found that thin metal discs of 0.10 in. in thickness provided with bosses of .005 in. in height give satisfactory operation, and while the number of such plates may be varied over relatively wide limits, I have found that a stack of from 12 to 24 plates gives very satisfactory results. Since the bosses are stamped in the discs themselves and in view of the thin metal employed, it will be seen that by the application of pressure these bosses will yield so as to permit the contraction of the spaces between the discs until all of the spaces may be substantially closed.

In order to accomplish the results contemplated herein, it is important that all of the beer entering the inlet chamber 18 be caused to flow into the spaces between the discs at the periphery of the stack and in flowing therethrough it will spread out into thin sheets or films which offer the resistance mentioned above, such beer finding its outlet in the passage through the center of the stack from which it travels downwardly into the outlet chamber 19 and thence through the discharge passage 30. In order to force the beer to flow in the manner just described, it is necessary to provide cover means on top of the stack which will seal the top of the passage 44 from the inlet chamber 18.

In this form of my invention such cover means is shown as comprising a cover plate 50 having a passage 51 therethrough in coaxial relation with the passage through the stack of discs, the region of the cover plate surrounding the passage 51 being adapted for engagement by a pressure sealing ring 53 which is mounted on the lower end of a sleeve member 54.

The sleeve member 54 is threaded through a passage 55 in the top 13 of the housing and its upper end extends through a stuffing box 56 mounted on the top 13, the extending portion thereof being provided with a handle member 57 which is keyed or pinned thereto as indicated at 58.

It will thus be seen that when the sleeve 54 is rotated so as to bring the ring 53 into pressure engagement with the cover plate 50 that the top of the passage 44 through the stack of discs is sealed from the inlet chamber 18 and all of the beer flowing through the nozzle unit must pass from the periphery of the stack of discs through the spaces therebetween into the passage 44.

The spaces between the discs can be readily adjusted to give the desired flow merely by rotating the sleeve 54 in its threads 55 through the medium of the handle 57, and for the purpose of indicating the amount of such adjustment I show the handle 57 as being provided with a downward extending finger 60 which has a pointer 61 at its lower end adapted to cooperate with indications 62 formed on the cover plate 13 as is best illustrated in Fig. 2.

For the purpose of actuating the valve disc 31 I show such disc as being provided with a valve stem 64 which has a bottom bearing 65 in a recess formed in the top of the fitting 14. This valve stem extends upwardly through the passages 36, 38, 44 and 51 and through the sleeve 54, such stem being of a length such that its upper end extends a substantial distance above the top of the handle 57. The top of the valve stem is provided with an actuating handle indicated at 67. In order to prevent leakage of beer from the outlet chamber 19 upwardly around the valve stem, I show the stem as being provided with a flange or collar 69 situated near the lower end of the sleeve 54, such collar supporting packing 70 which is held in tight engagement between the valve stem and the sleeve by a slidable collar 71 and a compression spring 72 interposed between the top of such collar and an inwardly extending shoulder 74 on the handle 57 at the upper end of the sleeve.

The operation of the device and the manner in which the filter unit or the flow resisting unit comprised of the stack of plates 42 is effective to restrict the flow of beer passing through the draught means, should be readily apparent from the foregoing description and, as has been pointed out above, the stack of discs with their very thin spaces not only constitutes means for restricting the flow, but it also acts as a filter. In the event it is desired to have a high velocity flow through the unit for the purpose of washing and cleaning the lines connected therewith, the sleeve 54 is merely rotated into its uppermost position which provides a direct passage from the inlet chamber 18 through the central passages 44, etc. The disc unit may be cleaned by applying a reverse flow of cleaning fluid through the unit, or if desired, it may be observed that the housing is so constructed that the disc or plate unit may be readily and quickly removed and replaced from time to time.

It is to be understood that while I have herein described and illustrated one preferred form of my invention and have shown the same as being embodied in the faucet itself, that the invention is not limited to the precise construction or location described above, but includes within its scope whatever changes fairly come within the spirit of the appended claims.

I claim as my invention:

1. For use in a beer dispensing system or the like, a flow control unit comprising: a housing having inlet and outlet openings; and a stack of spaced thin plate members interposed in the path of flow of liquid passing through said housing; said plates comprising discs having aligned openings through their centers and said inlet and outlet openings being arranged so that the path of flow of said liquid lies between the openings through said discs and their peripheries.

2. For use in combination with the draught means in a beer dispensing system, a flow controlling nozzle member embodying: a housing having an inlet near its upper end and an outlet at its lower end; a partition member mounted across said housing between said inlet and outlet and forming an outlet chamber therebelow; a stack of thin plate members mounted on said partition member in vertically spaced relation with each other, said plate members and said partition having a central passage communicating with said outlet chamber; and cover means on said stack of plates sealing the top of said central passage from the portion of the housing communicating with said inlet opening.

3. For use in combination with the draught means in a beer dispensing system, a flow controlling nozzle member embodying: a housing having an inlet near its upper end and an outlet at its lower end; a partition member mounted across said housing between said inlet and outlet and forming an outlet chamber therebelow; a stack of thin plate members mounted on said partition member in vertically spaced relation with each other, said plate members and said partition having a central passage communicating with said outlet chamber; cover means on said stack of plates sealing the top of said central passage from the portion of the housing communicating with said inlet opening; and means associated with said plate cover means for applying pressure to said stack of plates to vary the spaces therebetween.

4. For use in combination with the draught means in a beer dispensing system, a flow controlling nozzle member embodying: a housing having an inlet near its upper end and an outlet at its lower end; a partition member mounted across said housing between said inlet and forming an outlet chamber therebelow; a stack of thin plate members mounted on said partition member in vertically spaced relation with each other, said plate members and said partition having a central passage communicating with said outlet chamber; cover means on said stack of plates sealing the top of said central passage from the portion of the housing communicating with said inlet opening; and means associated with said plate cover means for applying pressure to said stack of plates to vary the spaces therebetween, said last mentioned means comprising a vertical member threaded in the top of said housing, and a handle on the extending end of said vertical member.

5. For use in combination with the draught means in a beer dispensing system, a flow controlling nozzle member embodying: a housing having an inlet near its upper end and an outlet at its lower end; a partition member mounted across said housing between said inlet and outlet and forming an outlet chamber therebelow; a stack of thin plate members mounted on said partition member in vertically spaced relation with each other, said plate members and said partition having a central passage communicating with said outlet chamber; cover means on said stack of plates sealing the top of said central passage from the portion of the housing communicating with said inlet opening; means associated with said plate cover means for applying pressure to said stack of plates to vary the spaces therebetween, said last mentioned means comprising a vertical member threaded in the top of said housing; a handle on the extending end of said vertical member; and indicating means associated with said handle.

6. For use in combination with the draught means in a beer dispensing system, a flow controlling nozzle member embodying: a housing having an inlet connection and an inlet chamber at its upper end and an outlet connection and an outlet chamber at its lower end; partition means in said housing separating said chambers; a stack of thin plates mounted on said partition; means associated with the individual plates in said stack for holding them in vertically spaced relation; said plates and said partition having a central passage therethrough; cover means on said stack of plates for sealing the top of said central passage from said inlet chamber; a valve in said outlet chamber; and an operating stem on said valve extending upwardly through said central passage through said cover member and through the top of said housing.

7. For use in combination with the draught means in a beer dispensing system, a flow controlling nozzle member embodying: a housing having an inlet connection and an inlet chamber at its upper end and an outlet connection at its lower end; partition means in said housing separating said chambers; a stack of thin plates mounted on said partition; means associated with the individual plates in said stack for holding them in vertically spaced relation; said plates and said partition having a central passage therethrough; cover means on said stack of plates for sealing the top of said central passage from said inlet chamber; a valve in said outlet chamber; an operating stem on said valve extending upwardly through said central passage and through said cover member and the top of said housing; said cover member including a sleeve secured in the top of said housing; and packing means in said sleeve surrounding said valve stem.

8. For use in combination with the draught means in a beer dispensing system, a flow controlling nozzle member embodying: a housing having an inlet connection and an inlet chamber at its upper end and an outlet connection and an outlet chamber at its lower end; partition means in said housing separating said chambers; a stack of thin plates mounted on said partition; yieldable means associated with the individual plates in said stack for holding them in vertically spaced relation, said plates and said partition having a central passage therethrough; cover means on said stack of plates for sealing the top of said central passage from said inlet chamber; a valve in said outlet chamber; an operating stem on said valve extending upwardly through said central passage, and through said cover member and the top of said housing, said cover member including a sleeve threaded through the top of said housing for adjustably applying pressure to said stack of plates to compress the yieldable spacing means therein; and packing means in said sleeve surrounding said valve stem.

DONALD G. GRISWOLD.